May 25, 1965  A. N. GENOVESE  3,185,903
HERMETICALLY SEALED VARIABLE CAPACITOR
Filed June 15, 1961
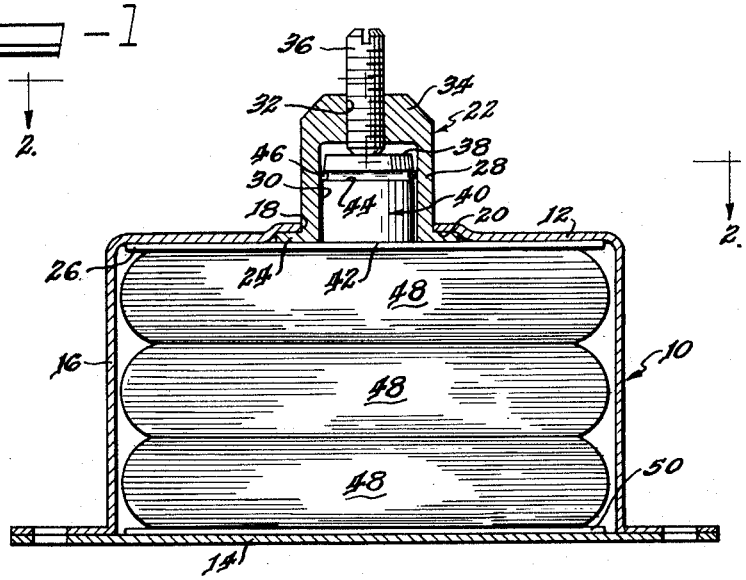
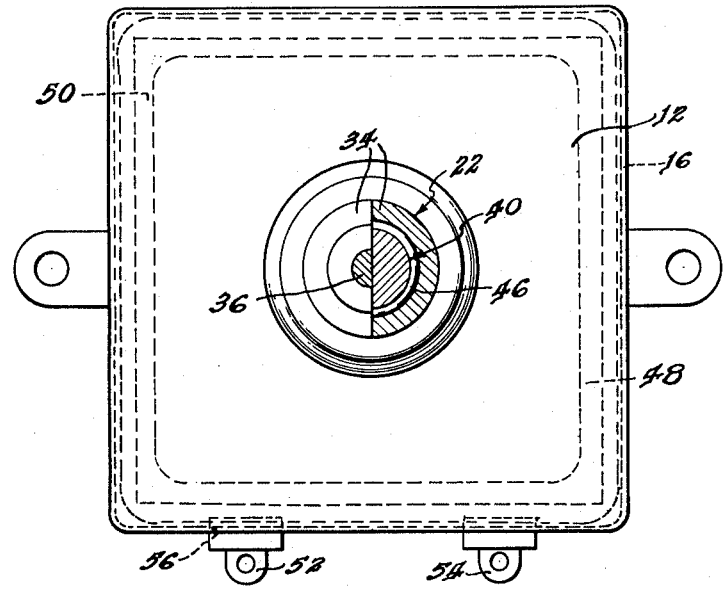
Inventor
Anthony N. Genovese
Stone, Nierman,
Burmeister & Zummer
Attorneys

United States Patent Office 3,185,903
Patented May 25, 1965

3,185,903
HERMETICALLY SEALED VARIABLE CAPACITOR
Anthony N. Genovese, Chicago, Ill., assignor to Chicago Condenser Corporation, Chicago, Ill., a corporation of Illinois
Filed June 15, 1961, Ser. No. 117,232
3 Claims. (Cl. 317—245)

The present invention elates generally to electrical capacitors, and more particularly to electrical capacitors which are not varied in capacity during operation, but which may require capacity adjustment from time to time.

Most electrical and electronic devices employ capacitors in their circuits. The capacitors used may either be of a fixed type or a variable type, and the fixed capacitors are selected to have a capacity within the permissible range required by the circuit. Variable capacitors are provided either for initial adjustment, or for selection of the circuit parameters desired for a particular purpose at hand. The present invention is directed to such variable capacitors, and particularly to variable capacitors which are intended to maintain their adjustment over long periods of time.

Temperature and humidity conditions may affect the capacity of a variable capacitor. It is therefore desirable to hermetically seal a capacitor in order to prevent changes in atmospheric conditions from affecting the capacity of the capacitor. It has been relatively simple to provide hermetically sealed fixed capacitors, but because of the fact that a mechanical adjusting member must operate through the sealing means of a variable capacitor, it has been more difficult to hermetically seal variable capacitors. Patent No. 1,763,771 to Geloso discloses a variable capacitor in which the capacity element is disposed within a casing, and adjustment of the capacity element is achieved by a screw threaded through the casing. Such a structure reduces the effect of ambient atmosphere changes, but does not eliminate them. Patent No. 2,714,184 to Peck discloses a capacitor in which a bellows surrounds a screw adjusting member and seals the interior of the capacitor casing about the threaded aperture for the screw. Patent No. 2,799,816 to Schwartz discloses a somewhat similar construction in which a diaphragm sealed to the interior of the capacitor casing forms a hermetic seal and permits adjustment of capacitor windings by actuation of a screw on the exterior side of the diaphragm. Both the bellows and diaphragm can be effective in providing hermetic seals for adjustable capacitors, but both require sealing of an additional element within the casing, either the bellows or the diaphragm.

It is an object of the present invention to provide an adjustable capacitor of the sealed type which does not require the sealing of a flexible element between the interior of the casing of the capacitor and the adjusting means.

It is a further object of the present invention to provide a hermetically sealed adjustable capacitor which may be more readily assembled than those heretofore known to the art and which may be fabricated at a reduced cost from those previously known.

It is to be understood that the present invention is applicable to other types of electrical components as well as capacitors. For example, the present invention may be utilized in providing an adjustable variable resistor. Other applications and advantages of the present invention will be readily devised by those skilled in the art from a further consideration of this disclosure, particularly when viewed in the light of the drawings, in which:

FIGURE 1 is a sectional view of a capacitor constructed according to the teachings of the present invention; and FIGURE 2 is a sectional view of the capacitor of FIGURE 1 taken along the line 2—2.

As illustrated in the figures, the adjustable capacitor has a casing 10 which has a top 12, bottom 14, and four walls 16 disposed on the sides of a square sealed between the bottom 14 and the top 12. The top 12 is provided with an aperture 18 at the center thereof, and a circular recess 20 extends about the aperture 18 from the interior of the casing 10.

A dome 22 extends through the opening 18 in the top 12 of the casing 10, and the dome 22 has a circular flange 24 disposed within the casing 10 and sealed to the surfaces of the top 12 formed by the indentation 20. The flange 24 forms an essentially flush surface with the portions of the top 12 surrounding the indentation 20, and a flat plate 26 is disposed within the casing adjacent to the flange 24. The dome 22 has a cylindrical portion 28 which extends normally from the top 12 of the casing 10 and has a circular bore 30 extending therein from the flange 24. A threaded aperture 32 extends through the end 34 of the dome 22 coaxially with the bore 30, and a threaded screw 36 is disposed within the aperture 32.

Screw 36 abuts a flat end 38 of a cylindrical plunger 40 and the screw 36 is effective to urge the plunger 40 into the casing 10. A second flat end 42 of the plunger 40 is disposed in abutment with the flat plate 26. The plunger 40 is provided with a semi-circular groove 44 which extends coaxially about the plunger 40, and a ring 46 of an elastomer material is disposed in the groove 44 and engages the walls of the bore 30 of the dome 22. The elastomer ring 46 may be of any sealing material, such as rubber, soft plastic, or the like, however, longest life for the elastomer ring is achieved if it is a self-lubricating plastic, such as silicone. The elastomer ring 46 must form a fluid tight seal between the plunger 40 and the cylindrical surface of the bore 30 of the dome 22.

A capacitor winding 48 is disposed within the casing in abutment with the plate 26. The capacitor winding 48 is formed by two electrically conducting coils separated by a dielectric coil, as is conventional in wound capacitors. This capacitor winding 48 is loosely wound and disposed with the winding axis parallel to the plate 42, so that compression of the winding increases the capacity thereof. Also, a second flat plate 50 is disposed adjacent to the bottom 14 of the casing 10, so that exerting pressure on the plate 26 compresses the capacitor winding 48 between the plates 26 and 50, thereby distributing the force exerted on the capacitor winding 48.

It is to be understood that additional capacity may be achieved, as here disclosed, by providing a plurality of windings 48 within the housing, the windings being stacked one on another. For this reason, FIGURE 1 shows three such windings 48 disposed between the plates 26 and 50, although it is to be understood that a single winding 48 may be employed as well as other numbers of windings.

The electrically conducting coils of the windings 48 are connected to terminals 52 and 54 which extend through apertures 56 in the casing 10. In this manner, electrical contact to the exterior of the casing is achieved.

The capacity of the adjustable capacitor illustrated in the figures may be increased by further inserting the screw 36 into the dome 22, thereby compressing the capacitor windings 48. In like manner, the capacity of the adjustable capacitor may be reduced by screwing the screw 36 outwardly from the dome 22 and permitting the pressure exerted by the windings 48 to force the plate 26 toward the top 12 of the casing 10, thereby reducing the capacity of the unit. In typical applications, it is desired to achieve a particular capacity with great accuracy. This may be accomplished in the particular surroundings desired by adjusting the screw 36, and thereafter the capacity of the adjustable capacitor will remain substantially unaltered in spite of changes in atmospheric conditions.

The capacity windings 48 may be replaced by any pressure sensitive electrical transducer desired to provide a simple and effective hermetically sealed unit. For example, the casing 10 may be filled with carbon granules to provide a variable resistor, or the casing 10 may house a helical coil in which the turns become spaced by smaller distances in response to pressure. It is therefore intended that the scope of the present invention be not limited by the foregoing disclosure, but rather only by the appended claims.

The invention claimed is:

1. An adjustable capacitor comprising an air tight casing having two parallel flat walls, one of said walls having an opening therein, a dome sealed to the exterior of the casing confronting the opening and having a straight channel extending therein aligned with the opening and normal to the walls of the casing, said dome having a bore extending from the channel to the exterior of the dome, a piston slidably disposed in the channel having a groove disposed thereabout in a plane parallel to the walls of the casing, an elastomer sealing ring disposed in the groove in sealing engagement with the piston and the surface of the channel, means for positioning the piston in the channel from the exterior to the dome through the bore of the dome, a flat plate disposed within the casing parallel to the walls and in abutment with the piston, and a capacitor winding disposed within the casing between the side of the plate opposite the piston and the confronting wall, side winding being wound about an axis disposed generally parallel to the walls of the casing.

2. An adjustable capacitor comprising an air tight casing having two parallel flat walls, one of said walls having an opening therein, a dome sealed to the exterior of the casing confronting the opening and having a cylindrical channel extending therein aligned with the opening and normal to the walls of the casing, said dome having a bore extending coaxially from the channel to the exterior of the dome, a cylindrical piston slidably disposed in the channel having a groove disposed thereabout in a plane parallel to the walls of the casing, an elastomer sealing ring disposed in the groove in sealing engagement with the piston and the surface of the channel, a screw threaded within the bore for positioning the piston in the channel from the exterior to the dome, a flat plate disposed within the casing parallel to the walls and in abutment with the piston, a capacitor winding disposed within the casing between the side of the plate opposite the piston and the confronting wall, said winding being wound about an axis disposed generally parallel to the walls of the casing, and two electrical terminals electrically connected to the capacitor winding and mounted on the casing and electrically insulated therefrom, said terminals extending through apertures in the casing and being sealed about said apertures.

3. An adjustable capacitor comprising an air tight casing having two parallel flat walls, one of said walls having an opening therein, a dome sealed to the exterior of the casing confronting the opening and having a cylindrical channel extending therein aligned with the opening and normal to the walls of the casing, the diameter of the channel being no greater than the diameter of the opening, said dome having a bore extending coaxially from the channel to the exterior of the dome, a cylindrical piston slidably disposed in the channel having a groove disposed thereabout in a plane parallel to the walls of the casing, an elastomer sealing ring of self-lubricating plastic material disposed in the groove in sealing engagement with the piston and the surface of the channel, a screw threaded within the bore having one end exterior of the dome and the other end in abutment with the piston for positioning the piston in the channel from the exterior to the dome, a flat plate disposed within the casing parallel to the walls and in abutment with the piston, a plurality of capacitor windings disposed within the casing, said windings being wound about an axis generally parallel to the walls of the casing and mounted in sandwich relationship between the side of the plate opposite the piston and the confronting wall of the casing, and two electrical terminals electrically connected to each capacitor winding and mounted on the casing and electrically insulated therefrom, said terminals extending through apertures in the casing and being sealed about said apertures, whereby the tension of the piston on the plate may be adjusted from the exterior of the casing and the casing is sealed to the passage of air between the casing and the ambient atmosphere.

References Cited by the Examiner
UNITED STATES PATENTS

| | | | |
|---|---|---|---|
| 297,126 | 4/84 | Freeman | 188—71 X |
| 2,799,816 | 7/57 | Schwartz | 317—249 X |
| 2,917,721 | 12/59 | Kelver | 338—164 |

JOHN F. BURNS, *Primary Examiner.*

UNITED STATES PATENT OFFICE
CERTIFICATE OF CORRECTION

Patent No. 3,185,903　　　　　　　　　　　　　　May 25, 1965

Anthony N. Genovese

It is hereby certified that error appears in the above numbered patent requiring correction and that the said Letters Patent should read as corrected below.

Column 1, line 9, for "elates" read -- relates --; column 3, line 31, for "side" read -- said --.

Signed and sealed this 21st day of December 1965.

(SEAL)
Attest:

ERNEST W. SWIDER　　　　　　　　　　　　EDWARD J. BRENNEI
Attesting Officer　　　　　　　　　　　　　Commissioner of Patent